United States Patent
Holthaus et al.

[11] Patent Number: 5,832,076
[45] Date of Patent: Nov. 3, 1998

[54] APPARATUS AND METHOD FOR DETERMINING THE PRESENCE AND POLARITY OF DIRECT CURRENT BIAS VOLTAGE FOR MICROPHONES IN TELEPHONE SETS

[75] Inventors: James R. Holthaus, Omaha, Nebr.; David L. Dilley, Ft. Collins, Colo.

[73] Assignee: Transcrypt International, Inc., Lincoln, Nebr.

[21] Appl. No.: 689,219

[22] Filed: Aug. 7, 1996

[51] Int. Cl.$^6$ ..................................................... H04M 1/60
[52] U.S. Cl. ........................... 379/387; 379/377; 379/395; 381/112
[58] Field of Search ..................................... 379/387, 395, 379/382, 377; 381/111, 112, 122

[56] References Cited

U.S. PATENT DOCUMENTS

| | | | |
|---|---|---|---|
| 2,877,302 | 3/1959 | Radomski et al. | 324/458 |
| 3,249,698 | 5/1966 | Benmussa et al. | 379/395 |
| 3,277,243 | 10/1966 | Fairbairn | 379/377 |
| 3,733,441 | 5/1973 | McCorkle et al. | 379/395 |
| 3,772,592 | 11/1973 | Rhodes | 379/390 |
| 3,976,849 | 8/1976 | Champan | 379/21 |
| 4,160,122 | 7/1979 | Jacobson | 379/395 |
| 4,178,486 | 12/1979 | Young | 379/373 |
| 4,491,694 | 1/1985 | Harmeyer | 379/442 |
| 4,893,331 | 1/1990 | Horiuchi et al. | 379/441 |
| 5,036,536 | 7/1991 | Hanon et al. | 379/395 |
| 5,058,155 | 10/1991 | Larsen | 379/442 |
| 5,099,514 | 3/1992 | Acree | 379/441 |
| 5,140,631 | 8/1992 | Stahl | 379/377 |
| 5,185,789 | 2/1993 | Hanon et al. | 379/395 |
| 5,199,065 | 3/1993 | Von Zitzewitz et al. | 379/395 |
| 5,333,177 | 7/1994 | Braitberg et al. | 379/441 |
| 5,396,551 | 3/1995 | Lucey | 379/395 |
| 5,577,129 | 11/1996 | Ehara | 379/395 |

*Primary Examiner*—Ahmad F. Matar
*Assistant Examiner*—Jacques M. Saint-Surin
*Attorney, Agent, or Firm*—Zarley, McKee, Thomte, Voorhees & Sease

[57] ABSTRACT

An apparatus and method for determining the presence and polarity of DC bias voltage at a telephone microphone. A circuit can be added in parallel between any hand or headset and a telephone base unit. The circuit converts the DC bias voltage, if any, across the microphone into a pulsed signal. Each pulse charges a capacitor. The output of the capacitor is passed through a resistor transformer network, and sampled. In between each pulse, the capacitor is discharged and the resulting signal is passed through the transistor/resistor network and sampled. By determining the averages of the charging and discharging signals, and sampling them to convert it into digital information, a digital signal processor can derive whether any bias voltage is present across the microphone, and, if so, its polarity. The circuit can be electrically isolated from the microphone and telephone.

27 Claims, 3 Drawing Sheets

APPARATUS AND METHOD FOR DETERMINING THE PRESENCE AND POLARITY OF DIRECT CURRENT BIAS VOLTAGE FOR MICROPHONES IN TELEPHONE SETS

BACKGROUND OF THE INVENTION

A. Field of the Invention

The present invention relates to microphones, and more particularly to microphones in telephones, and more particularly, to determining whether any DC bias voltage exists for a microphone, and if so, the polarity of such bias voltage.

B. Problems in the Art

In recent years there has been a proliferation of telecommunications methods and devices. With this proliferation has evolved a number of different types of telephone equipment and features. Different types of telephone equipment exist which can be used with conventional telephone systems and different components of these different types of telephone equipment can have different electrical characteristics.

An example is the microphone which must be used to convert acoustic energy of a telephone user into an electrical signal that can be transmitted over the telephone system. U.S. Pat. No. 5,185,798 to Hanon, et al., at column 1, lines 13–30 generally discusses different types of telephone microphones and the fact that the different types have different electrical characteristics. These differences are well known in the art. By way of example only, some of those differences are as follows. Carbon-type microphones have been long known and are relatively inexpensive and durable. However they consume a significant amount of electrical power, which generally is contrary to the desire to reduce power consumption. Electret or dynamic microphones use less electrical power, but generally require the use of alternating current or a battery to adequately power their operation which adds to component costs and complexity of the telephone. As is well known, the different types of microphones can have different impedances, demand on bias current, and signal magnitude, as well as different electrical power requirements.

Moreover, it is more common today that telephone base units differ from one another, that the base units may or may not include different microphones, including speaker phones, handsets and headsets, and that handsets or headsets may be added as after-market devices or exchanged for those that come with the base unit.

Therefore, a problem exists in the art. If a certain type of microphone with certain electrical characteristics is mismatched with the bias voltage available from the base unit, it can effect quality of transmission, and can even produce the risk of damage or failure of the equipment. Not only is knowledge of the presence or lack thereof of DC bias voltage at the microphone valuable, but the polarity of any such bias voltage is important for correct connection of the microphone to the base unit and likewise accurate operation of microphone.

The prior art such as Hanon, et al. mentioned above, and such as Horiuchi, et al. U.S. Pat. No. 4,893,331, Lucey U.S. Pat. No. 5,396,551, and Larsen U.S. Pat. No. 5,058,155, acknowledge the existence of their different types of telephone microphones, the different electrical characteristics, and the need to compensate for those different characteristics. Horiuchi at column 1, lines 38–68 and column 2, lines 1–3 recognizes that inter-connection of a carbon-type transmitter or microphone to a base unit with mismatched output impedance, output signal level, DC current, and the like would be impossible, if for example, the base unit was set up for an electret-type or dynamic-type transmitter, and conversely interconnection of a electret-type or dynamic-type transmitter to a base unit set up for a carbon-type transmitter would be impossible. Larsen discusses the fact that the impedance and signal levels of both the microphone and sound reproducer of various telephone instruments can vary from one type of instrument to another. There can be differences in the telephone systems, comparing Merlin (AT&T-type) systems used extensively in the U.S. to DYAD (Siemens) systems used in Europe. Concerns are raised in Larsen over the wiring configurations of different types of telephones systems which makes polarity an additional concern. See Larsen column 1, lines 23–44.

Lucey recognizes the different electrical characteristics of different types of microphones, see column 1, lines 9–41 and Hanon, column 1, lines 7–45 discuss the continuing objective to reduce power consumption and increase efficiency of components used with telephone systems and networks.

It is therefore the principal object of the present invention to overcome or improve over the problems and deficiencies in the state of the art. Other objects of the invention include provision of an apparatus and method for determining the presence and polarity of DC bias voltage for microphones in telephones sets:

a. that determine the presence or absence of DC bias voltage at the microphone;

b. that determine the polarity of any DC bias voltage at the microphone;

c. that determine both the presence and polarity of any bias voltage at the microphone;

d. that determine presence and polarity of DC bias voltage while maintaining electrical isolation from the telephone set to prevent the ground loop problems;

e. that determine presence and polarity of any DC bias voltage to allow regeneration of the correct bias voltage magnitude and polarity for a given microphone for correct and optimal operation of the microphone;

f. that determine presence and polarity of DC bias voltage without substantially effecting power consumption at the telephone set;

g. that determine presence and polarity of DC bias voltage for almost all types of telephone microphones and telephone sets;

h. that allows different microphones to be used for the same telephone base unit;

i. that is economical and efficient;

j. that provides information regarding presence; and polarity of DC bias voltage which can be useful for other add-on components for telephone sets.

These and objects, features and advantages of the present invention will become more apparent by reference to the accompanying specification and claims.

SUMMARY OF THE INVENTION

The present invention includes an apparatus and method to determine the presence and polarity of DC bias voltage for telephone microphone of a telephone set. The apparatus includes a circuit connected in parallel with the telephone microphone that in turn includes a switch which alternatingly closes and opens to produce a pulsed signal representative of any DC bias voltage. Each pulse of the pulsed signal charges a capacitor in the circuit. The time in between pulses includes a discharging of the capacitor. The pulsed signal is sent through a transformer to electrically isolate the circuit from the microphone and the telephone set.

The pulsed signal, charging and discharging through the capacitor, contains information which can be used to determine the presence and polarity of DC bias voltage. Optionally, the charging and discharging waveforms can be digitized through an A-to-D converter and communicated to a digital signal processor which can both control the operation of the switch the produces the pulse signal, and which can also derive presence and polarity of any DC bias voltage from the charging and discharging waveforms.

The method of the invention includes sensing the DC voltage, if any, across the telephone microphone, pulsing any voltage that appears, charging and discharging the capacitor through a transformer with the pulsed signal, and deriving information regarding presence and polarity of any DC bias voltage from the waveforms caused by the charging and discharging. Optionally, this can be done by averaging the magnitude for each charging cycle, averaging the magnitude for each discharging cycle, and comparing the two.

DETAILED DESCRIPTION OF THE PREFERRED EMBODIMENT

Figure 1:
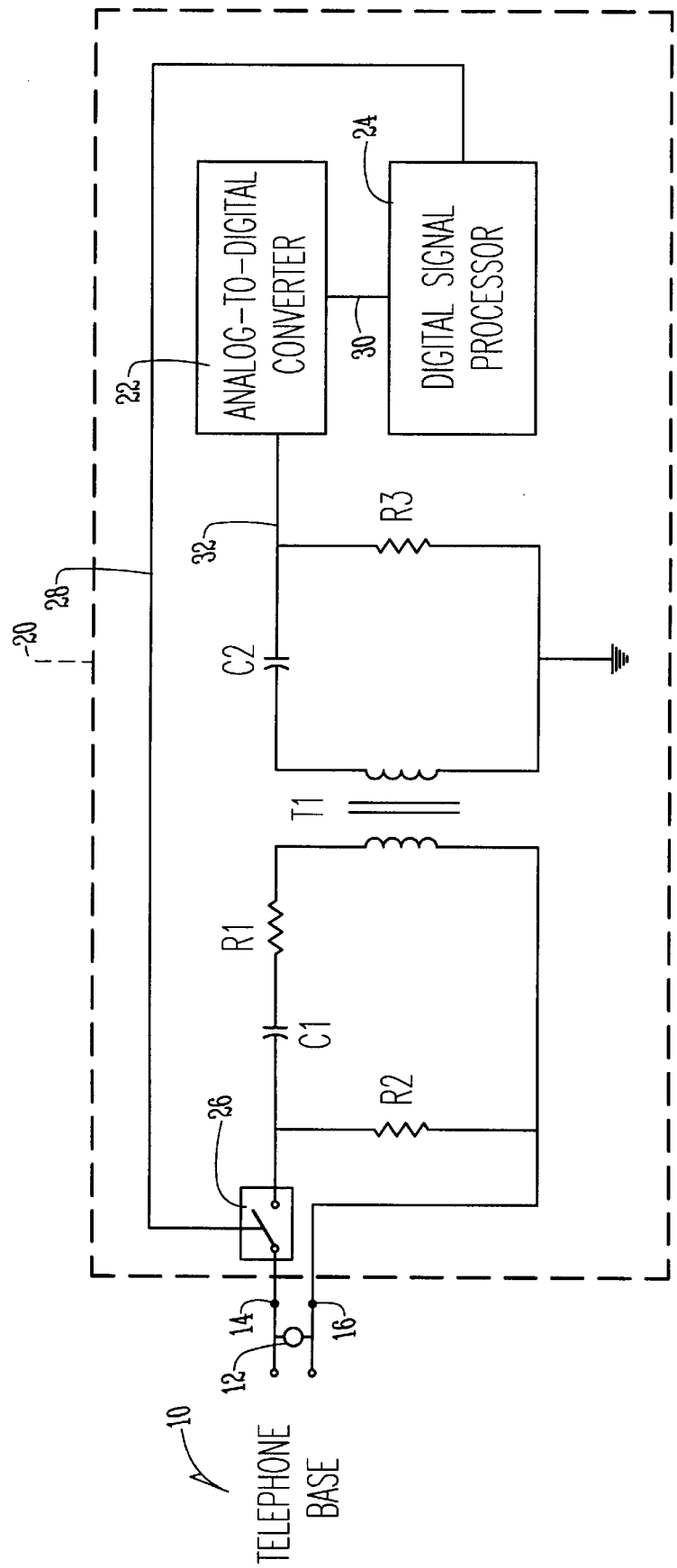
FIG. 1 is a schematic diagram of a preferred embodiment of a circuit according to present invention.

In order to achieve a better understanding of the invention, one embodiment which the invention can take will now be described in detail. Frequent reference will be made to the drawings which form a part of this description. Reference numerals will be used to indicate certain parts and locations in the drawings.

FIG. 1 illustrates a circuit that can be connected to telephone base unit 10 (such as is known in the art and therefore, not shown in any detail), and in particular, which can be connected in parallel to a telephone microphone 12 associated with base unit 10. Microphone 12 can be of almost any type, including but not limited to carbon-type, electret, and dynamic-type microphones, all such as are well known in the art. Electrical connections 14 and 16 illustrate the parallel connection of the circuitry according to the invention to microphone 12.

The circuit according to the present invention is indicated inside the dashed line 20 of FIG. 1. In this embodiment an A-to-D (analog-to-digital) converter 22 and digital signal processor (DSP) 24 are utilized. Switch 26 is controlled by lead 28 from DSP 24. A sequential alternating closing (conducting) and opening (non-conducting) of switch 26 produces essentially a chopped or square wave signal, (see waveform 27 in FIG. 2) where the magnitude of any DC bias voltage at microphone 12 is represented by the height of the pulses that issue from switch 26. In the preferred embodiment switch 26 is an optically isolated switch, such as are well known in the art, to assist in the electrical isolation of circuit 20 from microphone 12. Capacitor C1 charges during each pulse of the pulse signal issuing from the switch 26 and capacitor C1 discharges through what will be termed the load resistor, during the time between pulses. In the circuit of FIG. 1, all resistors R1, R2, and R3 contribute to the "load" and therefore collectively will be considered the load resistor. Transformer T1 passes the charging and discharging waveforms to A-to-D converter 22. Transformer Ti also serves to electrically isolate circuit 20 from microphone 12. These charging and discharging waveforms are digitized by A-to-D converter 22 (by methods and means well known in the art) and introduced through line 30 to DSP 24 where they can be processed to derive information regarding presence and polarity of DC bias voltage at microphone 12.

Operation of circuit 20 is as follows. DSP 24 instructs switch 26 to close (become conducting). Any microphone bias voltage at microphone 12 will cause capacitor C1 to begin charging. A-to-D converter 22 samples line 32 at 12 Khz (in the preferred embodiment), converts those samples to digital signals and passes that information via line 30 to DSP 24. The charging transient of capacitor C1 when switch 26 is closed therefore is in effect measured.

After a predetermined time controlled by DSP 24 (in this instance one millisecond(ms)), DSP 24 instructs switch 26 to open. Capacitor C1 then begins to discharge across resistors R1 and R2, and transformer T1. A-to-D converter 22 samples this discharging transient via line 32 at the same sampling rate and passes the information to DSP 24 in a digital form.

Switch 26 is sequentially and repeatedly closed and opened for at least several times. A noise threshold value is programmed into DSP 24. The absolute value of the average measurement for the switch 26 open condition is compared to the absolute value of the average measurement for the switch 26 closed condition. The larger of the two absolute values is compared to the noise threshold. If the larger absolute average measurement exceeds the noise threshold, then the presence of a bias voltage is confirmed. To determine the polarity of the bias voltage the original measurement average corresponding to the absolute value measurement which exceeded the noise threshold is used. Using a lift shift technique, the sign of the average measurement is determined as either positive or negative (as is will known in the art). If the average measurement corresponded to a switch 26 closed condition and the sign of the average measurement was positive, then a positive polarity is determined. If the average measurement sign was negative, then a negative polarity is determined. If the average measurement corresponded to a switch 26 open condition and the sign of the average measurement was positive, then a negative polarity is determined. If the sign of the average measurement was negative, then a positive polarity is determined.

Figure 2:
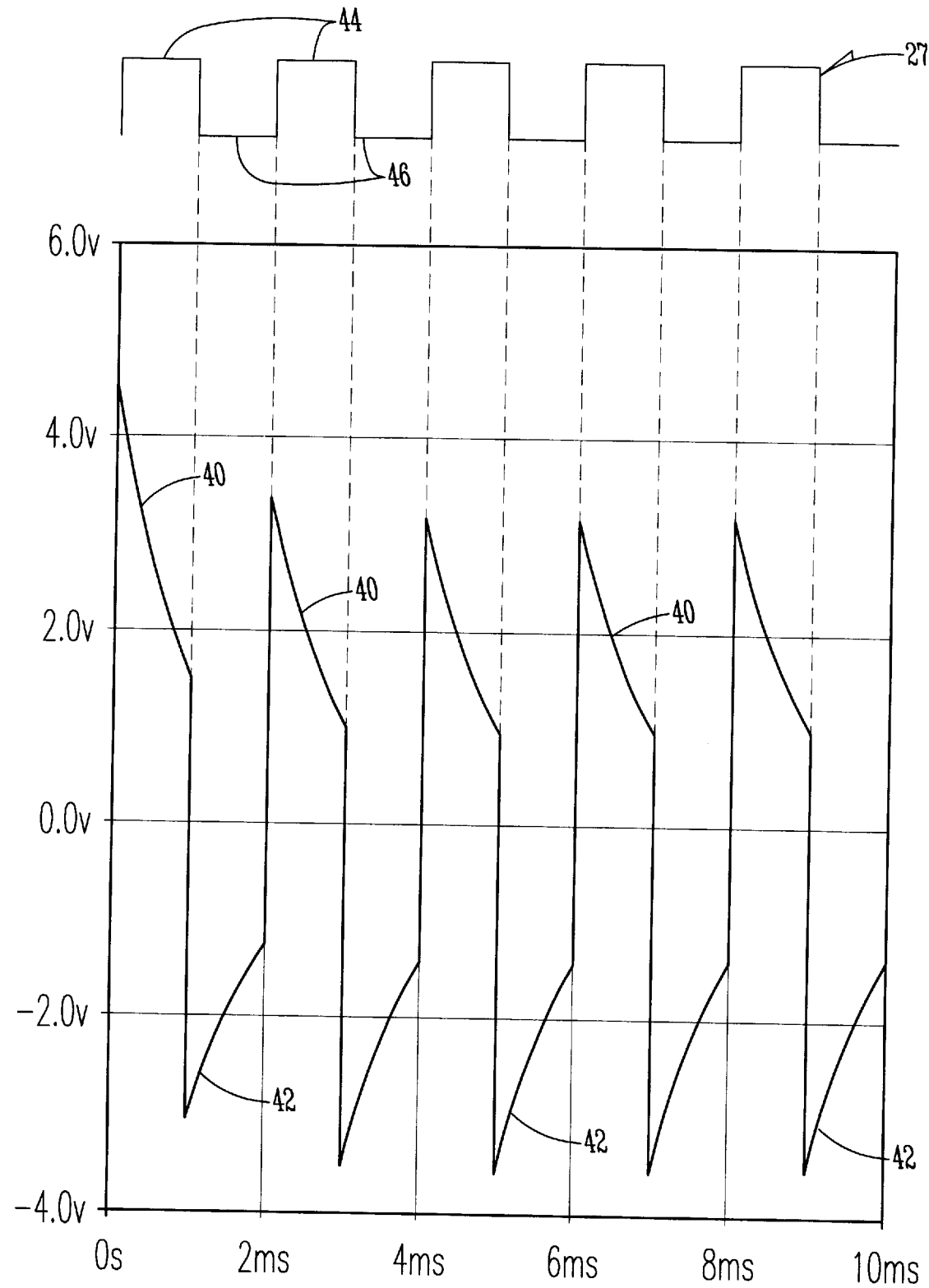
FIG. 2 is an example of a waveform created by the circuit of FIG. 1 indicating a positive bias voltage.
Figure 3:
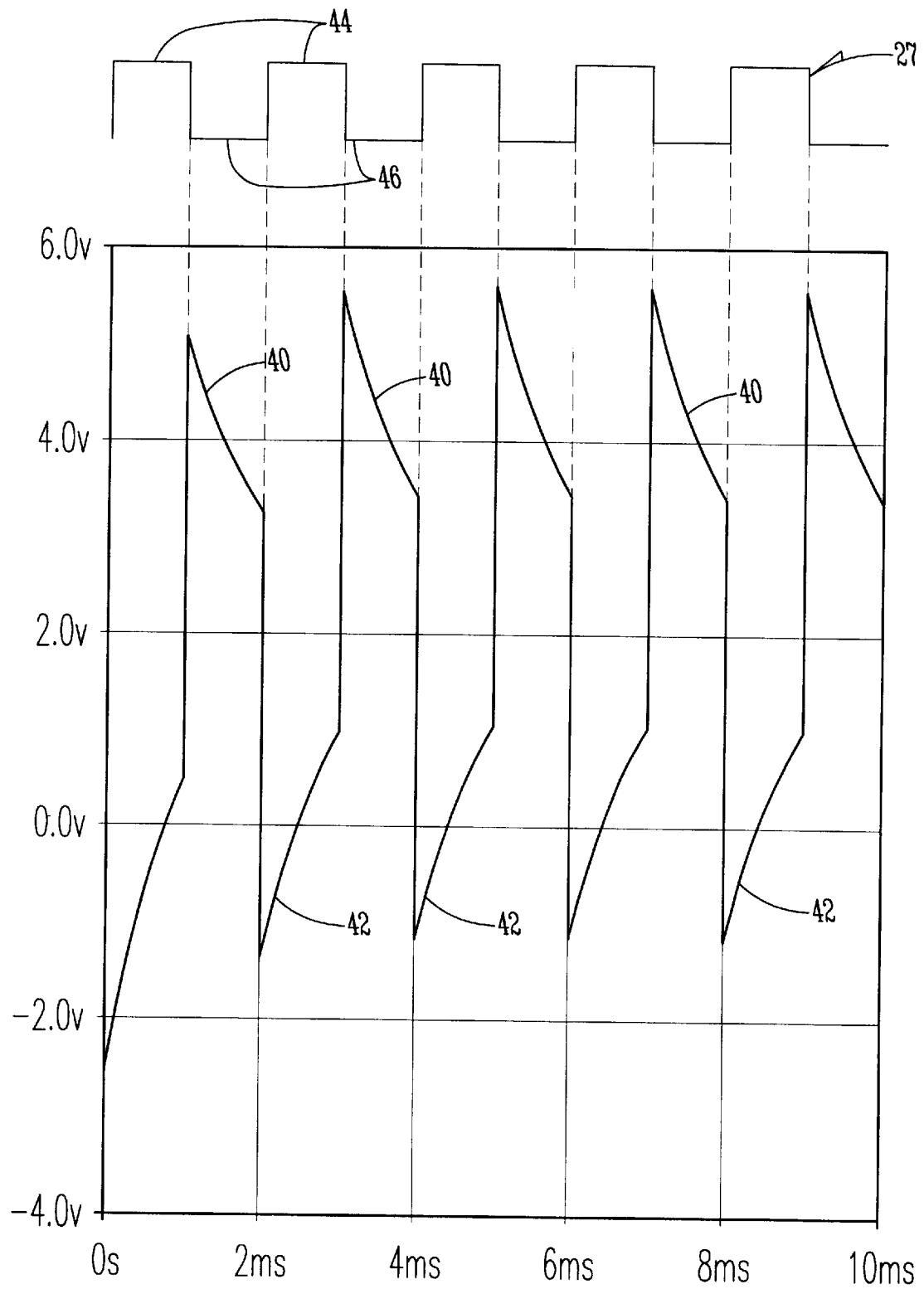
FIG. 3 is a diagram of the type of FIG. 2, but indicating a negative bias voltage.

FIGS. 2 and 3 illustrate representative oscilloscope frames of charging/discharging waveforms created by circuit 20. Both Figs. show the charging portions of the waveform (denoted by reference numeral 40) and discharging portions of the waveform (denoted by reference numeral 42), correlated to the pulses 44 and periods 46 between pulses 44 of the pulsed signal 27 issuing from switch 26. FIG. 2 is representative of a positive polarity bias voltage waveform; whereas FIG. 3 indicates a negative polarity bias voltage waveform.

Therefore, it can be seen, that by pulsing any DC bias voltage at microphone 12 to essentially emulate a chopped AC waveform and using the pulses to charge and discharge the capacitor, the charging and discharging waveforms can be utilized to not only detect the presence of bias voltage at microphone 12, but also its polarity. As discussed previously, this information is very valuable to enable the correct operation of a given microphone with a given telephone set and telephone system.

It furthermore can be seen that this detection of presence and polarity of microphone bias voltage is accomplished with electrical isolation of circuit 20 from the microphone in the telephone set by utilizing the transformer T1 and optically isolated switch 26 which can prevent ground loop problems.

Any direct current voltage signal at microphone 12 is therefore effectively modulated by circuit 20 which allows it to pass through transformer T1. The characteristics of that modulated signal are measured at the secondary side of transformer T1 to determine existence and polarity of the direct current voltage signal. If no microphone bias is present, no variation in the charging/discharging signal is observed and DSP 24 can conclude there is an absence of DC bias voltage at microphone 12.

The presence and polarity of microphone bias voltage can be used to regenerate the required bias voltage needed for the microphone. Circuit 20 can be utilized with nearly all types of microphones and telephone sets in existence today.

The included preferred embodiment is given by way of example only, not by way of limitation to the invention, which is solely described by the claims herein. Variations obvious to those skilled in the art will be included in the invention defined by the claims. In the preferred embodiment the frequency of closing and opening switch 26 was 500 Hz, to create a 500 Hz square wave. Other components in circuit 20 were chosen so that at this frequency, it could be assumed that capacitor C1 was fully charging during each pulse time.

The value of resistor R1 controls how fast capacitor C1 charges, and the storage capability of capacitor C1 also comes into play. The rate of discharge of capacitor C1 is controlled by resistor R2. It is generally preferred that R2 be significantly bigger in resistance than R1 (for example R1=1 k ohm and R2=100 k ohm). R2 is significantly bigger than R3 (for example R2=100 k ohm and R3=10 k ohm).

In the preferred embodiments the capacitor C1 is 1 microfarad and capacitor C2 is 0.1 microfarad. It is to be understood, however, that the specifications of the components of circuit 20 can be selected according to need by one skilled in the art and can vary for different circumstances such as will be recognizable by those skilled in the art.

It may be possible with circuit 20 to characterize the impedance of microphone 12 as well as other characteristics.

What is claimed:

1. An apparatus to determine presence and polarity of DC bias voltage for a microphone comprising:
    a parallel electrical connection to said microphone;
    a circuit connected to the electrical connection comprising;
    a switching subcircuit including in series a switch connected and controlled by a digital signal processor, a capacitor, and a primary side of a transformer, so that any current present in the switching subcircuit will induce current in a measuring subcircuit;
    the measuring subcircuit including in series the secondary side of the transformer and a load resistor
    an a-to-d converter connected to the measuring subcircuit and also connected to the digital signal processor;
    the digital signal processor operating the switch to pulse any microphone bias voltage, the capacitor charging with any bias voltage when the switch is closed and discharging when the switch is opened through the load resistor to create charging and discharging waveforms;
    the analog charging and discharging waveforms traversing the transformer, being sampled by the a-to-d converter and the sampled waveforms entering the digital signal processor so that the digital signal processor can determine from the charging and discharging waveforms the presence or lack thereof of microphone bias voltage and, if present, the polarity thereof while maintaining the measuring circuit electrically isolated from the telephone device.

2. The apparatus of claim 1 wherein the switch is an optically isolated switch.

3. The apparatus of claim 1 wherein the electrical connection is connected to a telephone microphone.

4. The apparatus of claim 3 wherein the microphone is selected from the set comprising carbon, electret, and dynamic microphones.

5. The apparatus of claim 1 where the load resistor comprises several resistors situated in one or both of the switching subcircuit and the measuring subcircuit.

6. The apparatus of claim 1 further comprising a discharge resistor in parallel with the capacitor and primary side of the transformer.

7. The apparatus of claim 1 wherein the discharge resistor allows the capacitor to discharge when the switch is non-conducting.

8. The apparatus of claim 1 further comprising a second capacitor in series with the secondary side of the transformer.

9. The apparatus of claim 1 wherein the apparatus is connected between a telephone microphone and a telephone base unit.

10. A circuit to determine presence and polarity of bias voltage of a telephone microphone of a telephone while keeping the circuit substantially electrically isolated from the telephone comprising:
    a switch;
    a transformer;
    a digital signal processor;
    an analog to digital convertor;
    a capacitor;
    a load resistor;
    the switch having a first pole connectable to one side of the telephone microphone to receive the DC bias voltage of the telephone microphone;
    the digital signal processor controlling a sequential opening and closing of the switch at a desired rate to produce a switch output of modulated bias voltage;
    the capacitor charging with the switch output and the capacitor discharging through the load resistor;
    the output of the capacitor passing through the transformer and to the A-to-D convertor;
    the output of the a-to-d convertor being sent to the digital signal processor;
    the output of the capacitor, once passed through the transformer, containing information regarding the magnitude and polarity of bias voltage, if any, at the microphone.

11. The circuit of claim 10 wherein control of the switch is electrically isolated form the telephone.

12. The circuit of claim 11 wherein the switch is an optically isolated switch.

13. The circuit of claim 10 wherein the digital signal processor averages the transients of the charging of the capacitor and the transients of the discharging of the capacitor to detect the presence of DC bias voltage at the microphone.

14. The circuit of claim 10 wherein the processor averages the transients of the charging of the capacitor and the transients of the discharging of the capacitor to detect the polarity of any DC bias voltage at the microphone.

15. A method for determining presence and polarity of DC bias voltage for a telephone microphone comprising:

monitoring the DC bias voltage of the telephone microphone;

pulsing the DC bias voltage in pulses of predetermined and generally equal pulse wide to emulate an AC signal;

charging and discharging a capacitor with the pulsed bias voltage and sending resulting signals from the capacitor through a transformer;

deriving information regarding presence and polarity of any DC bias voltage from signals from the transformer.

16. The method of claim 15 wherein the step of monitoring of DC bias voltage comprises connecting electrical leads in parallel across the telephone microphone.

17. The method of claim 15 wherein the step of pulsing comprises passing the DC voltage through a switch which is alternatingly closed and opened to produce a pulsed signal representative of any DC bias voltage at the telephone microphone.

18. The method of claim 15 wherein the step of charging and discharging of the capacitor comprises passing the pulsed signal to a capacitor, wherein the storage capacity of the capacitor and width of the pulses are coordinated so that each pulse charges the capacitor to approximately a level equal to the DC bias voltage, and further comprising a load resistor which discharges the capacitor energy in between each pulse.

19. The method of claim 15 wherein the charging and discharging signals are passed through a transformer to galvanically isolate the circuit from the telephone.

20. The method of claim 15 wherein the polarity of any DC bias current is derived by sensing the positive or negative value of the charging and discharging signals in comparison with their correlated position relative to the pulses.

21. The method of claim 20 wherein the polarity of any DC bias current is derived by comparing the absolute value of an average measurement for each pulse with the absolute value of an average measurement for in between each pulse, comparing the larger absolute value measurement to the noise threshold, and if exceeding the noise threshold, using a left shift technique to determine the sign of the larger absolute value measurement.

22. The method of claim 20 wherein the presence and magnitude of any DC bias voltage is derived by comparing the absolute value of an average measurement for each pulse with an absolute value of an average measurement for in between each pulse, and comparing the those averages with a noise threshold, and if below the noise threshold no bias voltage is present, and if above, determining its magnitude.

23. A method for determining presence and polarity of DC bias voltage for a telephone microphone comprising:

monitoring the DC bias voltage of the telephone microphone;

pulsing the DC bias voltage in pulses of predetermined and generally equal pulse width to emulate an AC signal;

charging and discharging a capacitor with the pulsed bias voltage and sending resulting signals from the capacitor through a transformer;

deriving information regarding presence and polarity of any DC bias voltage from signals from the transformer;

the step of charging and discharging of the capacitor comprising passing the pulsed signal to a capacitor, wherein the storage capacity of the capacitor and width of the pulses are coordinated so that each pulse charges the capacitor to approximately a level equal to the DC bias voltage, and further comprising a load resistor which discharges the capacitor energy in between each pulse.

24. A method for determining presence and polarity of DC bias voltage for a telephone microphone comprising:

monitoring the DC bias voltage of the telephone microphone;

pulsing the DC bias voltage in pulses of predetermined and generally equal pulse width to emulate an AC signal;

charging and discharging a capacitor with the pulsed bias voltage and sending resulting signals from the capacitor through a transformer, the charging and discharging signals are passed through a transformer to galvanically isolate the circuit from the telephone;

deriving information regarding presence and polarity of any DC bias voltage from signals from the transformer.

25. A method for determining presence and polarity of DC bias voltage for a telephone microphone comprising:

monitoring the DC bias voltage of the telephone microphone;

pulsing the DC bias voltage in pulses of predetermined and generally equal pulse width to emulate an AC signal;

charging and discharging a capacitor with the pulsed bias voltage and sending resulting signals from the capacitor through a transformer;

deriving information regarding presence and polarity of any DC bias voltage from signals from the transformer, the polarity of any DC bias current is derived by sensing the positive or negative value of the charging and discharging signals in comparison with their correlated position relative to the pulses.

26. The method of claim 25 wherein the polarity of any DC bias current is derived by comparing the absolute value of an average measurement for each pulse with the absolute value of an average measurement for in between each pulse, comparing the larger absolute value measurement to the noise threshold, and if exceeding the noise threshold, using a left shift technique to determine the sign of the larger absolute value measurement.

27. The method of claim 25 wherein the presence and magnitude of any DC bias voltage is derived by comparing the absolute value of an average measurement for each pulse with an absolute value of an average measurement for in between each pulse, and comparing the those averages with a noise threshold, and if below the noise threshold no bias voltage is present, and if above, determining its magnitude.

\* \* \* \* \*

UNITED STATES PATENT AND TRADEMARK OFFICE
CERTIFICATE OF CORRECTION

PATENT NO. : 5,832,076
DATED : November 3, 1998
INVENTOR(S) : Holthaus, et al.

It is certified that error appears in the above-identified patent and that said Letters Patent is hereby corrected as shown below:

In claim 1, column 5, line 62, please insert --;-- after the word "resistor".

In claim 11, column 6, line 63, please delete [form] and substitute --from--.

In claim 11, column 6, line 63, please insert --microphone-- after the word "telephone".

Signed and Sealed this

Sixteenth Day of March, 1999

Attest:

Q. TODD DICKINSON

Attesting Officer

Acting Commissioner of Patents and Trademarks